Aug. 24, 1954  C. W. SINCLAIR  2,687,161
RIM
Filed Jan. 15, 1951

INVENTOR.
CHARLES W. SINCLAIR
BY
Whittemore Hulbert & Belknap
ATTORNEYS

Patented Aug. 24, 1954

2,687,161

UNITED STATES PATENT OFFICE 2,687,161

RIM

Charles W. Sinclair, Detroit, Mich., assignor to Kelsey-Hayes Wheel Company, Detroit, Mich., a corporation of Delaware Application January 15, 1951, Serial No. 206,051

4 Claims. (Cl. 152—410)

The invention relates to rims and refers more particularly to pneumatic tire carrying rims of that type employing an endless base member, a detachable endless tire retaining member, and a detachable transversely split clamping ring member.

The invention has for one of its objects to provide an improved rim which is constructed to facilitate mounting and demounting of the tire.

The invention has for another object to provide an improved rim having its tire retaining member formed of strip stock to reduce the weight and also the cost of manufacture of the tire retaining member and as a consequence reduce the weight and the cost of manufacture of the rim.

The invention has for a further object to so form the tire retaining member that its portion which is adapted to seat on the clamping ring member is flexible to facilitate assembly and disassembly of the parts of the rim.

With these as well as other objects in view, the invention resides in the novel features of construction and combinations and arrangements of parts as more fully hereinafter set forth.

Figure 1:
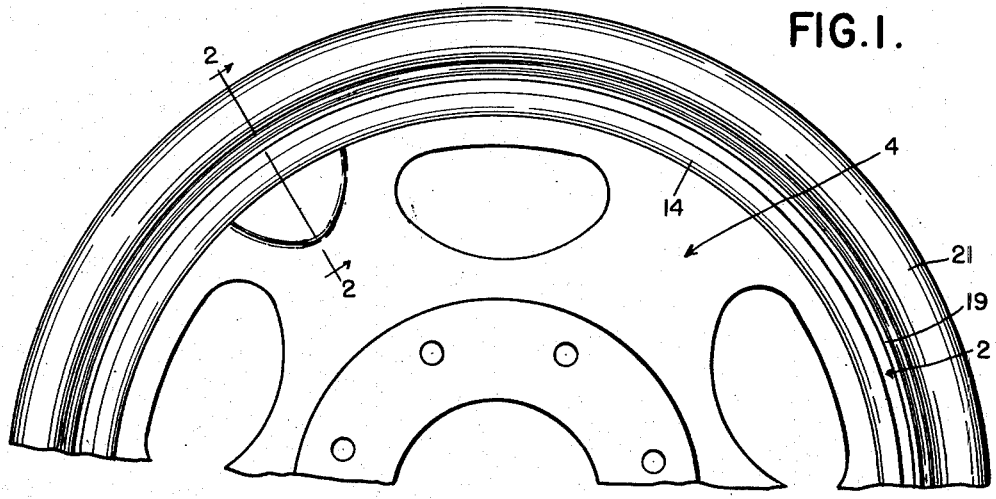
Figure 1 is an elevation of a wheel having a rim embodying the invention.
Figure 2:
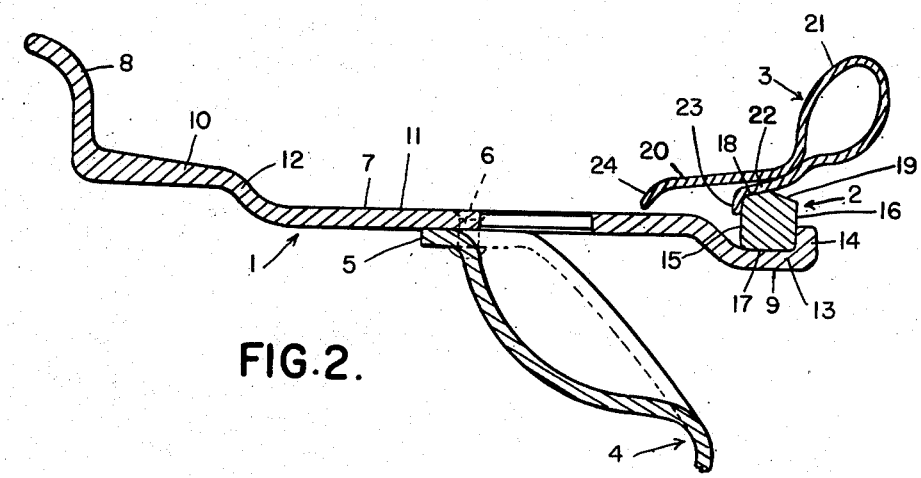
Figure 2 is an enlarged cross section on the line 2—2 of Figure 1.

In general, the rim is a pneumatic tire carrying rim forming part of a motor vehicle wheel. The rim comprises the annular base member 1, the detachable annular clamping member 2, and the detachable annular tire retaining member 3. The base member is connected to the wheel body 4 which, as illustrated, is a disc having the axially extending peripheral flange 5 to which the base member is secured by suitable means such as the rivets 6.

The base member 1 is endless and has the annular base 7, the integral annular tire retaining flange 8 extending generally radially outwardly from one edge of the base and the integral annular gutter 9 at the edge remote from the tire retaining flange. The base has the generally axially extending annular portions 10 and 11 of different diameters and the sloping annular portion 12 between and connecting the annular portions 10 and 11. The annular portion 10 is of greater diameter than the annular portion 11 and flared toward the tire retaining flange 8 to form a flared tire bead seat portion. The annular portion 11 extends between the sloping annular portion 12 and the gutter 9. The gutter has the cylindrical axially extending bottom wall 13 and the axially outer substantially radial annular wall 14 presenting a substantially radial surface facing axially inwardly. The latter wall has an external diameter preferably slightly less than the external diameter of the annular portion 11.

The annular clamping member 2 is a ring transversely split at one point and has the substantially radially extending axially inner and outer surfaces 15 and 16 respectively, the axially extending radially inner surface 17 and the radially outer surfaces 18 and 19 flared toward each other from the axially inner and outer surfaces, the angle of inclination to the axis being substantially 12°. The clamping ring, as thus constructed, is symmetrically arranged with respect to its axially central radial plane so that it is reversible. The axial dimension or width of the ring is less than the internal axial dimension or width of the gutter so that the latter may readily accommodate the former.

The tire retaining member 3 is formed of sheet metal and more particularly sheet steel from strip stock of substantially uniform thickness. The tire retaining member is endless and has the generally axially extending tire bead seat portion 20 extending over the annular portion 11 of the base, the hollow return bent tire retaining flange portion 21 connecting into the seat portion, the generally axially extending seating portion 22 connecting into the flange portion and extending within the tire bead seat portion and the generally radially extending portion 23 connecting into the seating portion. The radially inner parts of the flange portion 21 axially abut axially outwardly of the tire bead seat and radially outwardly or beyond the radially outer surface of the tire bead seat. The tire retaining member also has the radially inwardly curved terminal portion 24 at the axially inner edge of the tire bead seat portion 20 and presenting a tire engaging surface substantially like that of the annular portion 12. The radially outer surfaces of the bead seat portions 10 and 20 engageable with the beads of the tire casing are flared away from each other at an angle of substantially 5°.

In the operative position of the rim parts, the clamping ring is seated on the bottom wall 13 of the gutter and abuts the wall 14 of the gutter and the generally radial portion 23 of the tire retaining member abuts the clamping ring and the seating portion 22 of the tire retaining member is seated on one of the flared radially outer surfaces 18 and 19 of the clamping ring. The parts are held in this position by the inflated tire and furthermore are compelled to move to this position by the pressure exerted by the tire while being inflated. The radial dimensions between the radially inner surface 17 and the radially outer surfaces 18 and 19 of the clamping ring are greater than the normal radial distances between the radially outer surface of the gutter bottom wall 13 and the radially inner surface of the seating portion 22 of the tire retaining member so that the clamping ring in the operative position of the rim parts exerts radial pressure on both the base member and the tire retaining member.

For the purpose of facilitating movement of the seating portion of the tire retaining member over the opposed radially outer surface of the clamping ring to thereby facilitate assembly and disassembly of the rim parts the seating portion 22 is flexible and diverges with respect to the bead seat portion 20 so that the two portions are spaced from each other throughout the axial extent of the seating portion axially inwardly from a line substantially in the axially central radial plane of the clamping ring. Also the angle of inclination of the seating portion is substantially 12° so that in the assembled or operative position the seating portion has an extended bearing on the clamping ring.

What I claim as my invention is:

1. In a tire carrying rim, an endless annular base member having an annular gutter, a detachable transversely split clamping ring member extending within said gutter and a detachable endless tire retaining ring member movable over said base member and having a generally axially extending tire bead seat portion extending over and encircling said base member, a hollow return bent tire retaining flange portion connecting into said seat portion, a generally axially extending flexible portion connecting into said flange portion and extending within and radially spaced from said seat portion to permit flexing of said flexible portion toward said seat portion, and a generally radially extending portion connecting into said flexible portion, said flexible portion being seated on said clamping ring member and said generally radially extending portion bearing on the axially inner face of said clamping ring member.

2. In a tire carrying rim, an endless annular base member provided with an annular substantially radial wall, a detachable endless annular tire retaining member movable over said base member and having a generally axially extending tire bead seat portion extending over and encircling said base member, a hollow return bent tire retaining flange portion connecting into said seat portion, a generally axially extending flexible portion connecting into said flange portion and extending within and diverging with respect to said seat portion in radially spaced relation thereto permitting flexing of said flexible portion toward said seat portion, a generally radially extending portion connecting into said flexible portion, and a transversely split annular clamping member abutting said wall and generally radially extending portion and having a part located between said base member and flexible portion, said clamping member having radial dimensions greater than the normal radial distances between the portion of said base member engaged by said clamping member and said flexible portion and exerting radial pressure thereon.

3. In a tire carrying rim, an endless annular base member provided with an annular wall presenting a substantially radial surface, a detachable transversely split clamping ring member encircling said base member and abutting said substantially radial surface and a detachable endless tire retaining ring member movable over said base member and having a flared tire bead seat portion extending over and encircling said base member, a return bent tire retaining flange portion connecting into said seat portion, a flexible portion connecting into said flange portion and extending within and diverging with respect to said seat portion and a generally radially extending portion connecting into said flexible portion and presenting a substantially radial shoulder, said flexible portion being seated on a radially outer surface of said clamping ring member and being radially spaced from said seat portion throughout substantially the axial extent of said flexible portion to permit flexing of said flexible portion toward said seat portion and said generally radially extending shoulder engaging the axially inner face of said clamping ring member, said clamping ring member having radial dimensions greater than the normal radial distances between the portion of said base member engaged by said clamping ring member and said flexible portion.

4. In a tire carrying rim, an endless annular base member provided with an annular wall presenting a substantially radial surface, a detachable transversely split clamping ring member encircling said base member and abutting said substantially radial surface and a detachable endless tire retaining ring member movable over said base member and having a generally axially extending tire bead seat portion extending over and encircling said base member, a hollow return bent tire retaining flange portion connecting into said seat portion and provided with radially inner parts in axial abutment, a generally axially extending flexible portion connecting into said flange portion and extending within and diverging from said seat portion in radially spaced relation thereto permitting flexing of said flexible portion toward said seat portion, and a generally radially extending portion connecting into said flexible portion and presenting a substantially radial shoulder, said flexible portion being seated on said clamping ring member and the shoulder formed by said generally radially extending portion bearing on the axially inner face of said clamping ring member.

References Cited in the file of this patent

UNITED STATES PATENTS

| Number | Name | Date |
|---|---|---|
| 2,434,180 | Sinclair | Jan. 6, 1948 |
| 2,468,947 | Sinclair | May 3, 1949 |
| 2,563,748 | Riggs | Aug. 7, 1951 |